Figure 1:
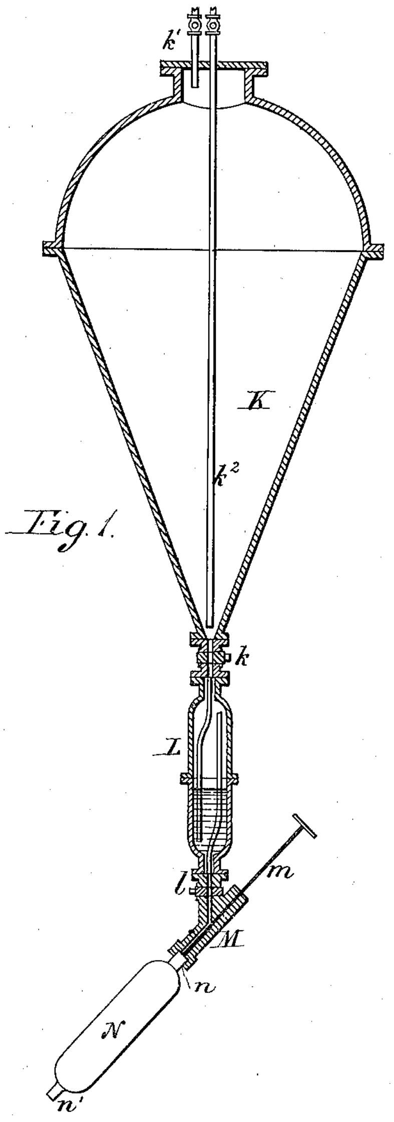

(No Model.) 2 Sheets—Sheet 1.

J. B. HANNAY.

APPARATUS FOR LIQUEFYING CHLORINE.

No. 418,019. Patented Dec. 24, 1889.

Witnesses:
J. A. Rutherford.
Geo. W. Rea.

Inventor:
James Ballantyne Hannay
By James L. Norris.
Attorney.

(No Model.) 2 Sheets—Sheet 2.

J. B. HANNAY.

APPARATUS FOR LIQUEFYING CHLORINE.

No. 418,019. Patented Dec. 24, 1889.

Witnesses:
J. A. Rutherford
Geo. W. Rea.

Inventor:
James Ballantyne Hannay.
By James L. Norris.
Attorney.

UNITED STATES PATENT OFFICE.

JAMES B. HANNAY, OF COVE CASTLE, LOCH LONG, COUNTY OF DUMBARTON, SCOTLAND.

APPARATUS FOR LIQUEFYING CHLORINE.

SPECIFICATION forming part of Letters Patent No. 418,019, dated December 24, 1889.

Application filed April 17, 1889. Serial No. 307,583. (No model.) Patented in England March 7, 1889, No. 4,037; in France April 6, 1889, No. 197,279; in Belgium April 6, 1889, No. 85,732; in Victoria May 10, 1889, No. 6,743; in New South Wales May 13, 1889, No. 1,412; in Queensland May 13, 1889, No. 739; in South Australia May 14, 1889, No. 1,301, and in New Zealand May 23, 1889, No. 3,700.

*To all whom it may concern:*

Be it known that I, JAMES BALLANTYNE HANNAY, a subject of the Queen of Great Britain, residing at Cove Castle, Loch Long, in the county of Dumbarton, Scotland, have invented a new and useful Apparatus for Storage and Transport of Liquefied Chlorine, (for which I have obtained patents in France, dated April 6, 1889, No. 197,279; Belgium, dated April 6, 1889, No. 85,732; Victoria, dated May 10, 1889, No. 6,743; New South Wales, May 13, 1889, No. 1,412; New Zealand, May 23, 1889, No. 3,700; South Australia, May 14, 1889, No. 1,301; Queensland, dated May 13 and August 23, 1889, No. 739, and in Great Britain by an application for patent, which patent, when granted, will bear date March 7, 1889, No. 4,037,) of which the following is a specification.

In an application for patent of even date herewith I describe apparatus for applying chlorine to the extraction of gold from ores.

In many situations—as, for example, at the mines where the ore is found—it is difficult to obtain chlorine, and the transport of materials for its production on the spot involves great expense and inconvenience. It is also difficult and often impossible to transport chlorine in the gaseous form on account of the large bulk which it occupies. In order to provide against these difficulties, I produce chlorine in liquefied condition and store it in this condition in vessels which can be readily and conveniently transported, and from which it can be drawn for use when required. In order to obtain and store the liquefied chlorine, I produce gaseous chlorine in any known manner under a little pressure, sufficient to cause it to bubble through water contained and agitated in a series of vessels which are kept cooled to about freezing-point. In each of those vessels through which the chlorine passes successively a portion of the chlorine forms a combination with water, producing a crystalline deposit. As this deposit is formed most rapidly in the first vessel and more slowly in those succeeding it, I arrange the connecting-pipes so that the vessels can be worked in rotation. When the first has a sufficient amount of deposit, it is cut off from the chlorine-supply and the deposit is removed from it, the second vessel in the meantime operating as the first, and so on successively. The deposit removed from the vessel, being squeezed to press out free water, is charged into a strong vessel having a funnel-shaped bottom with a small outlet. The vessel being charged is closed, and then a little heat is applied externally. This heating effects separation of the chlorine from the water with which it was combined, the chlorine subsiding in liquid condition toward the bottom of the vessel, while the water floats above it. To the bottom of the separating-vessel (preferably with an intermediate vessel, which may be charged with sulphuric acid to trap any water accompanying the chlorine) is connected one of the holders or vessels in which the liquid chlorine is charged for transport. This vessel is a thin but strong steel tube closed at both ends with a small internally-screwed hole in a boss projecting at its end. This hole is fitted with a screw-plug contained in a tube attached to the boss, this tube being connected to the separating-vessel by a lateral branch provided with a valve. The connection being made to the holder, the valve is opened, and the liquid chlorine, which is under considerable pressure in the separating-vessel, passes into the holder, whereupon the screw-plug is screwed home until a collar on it presses hard upon a packing-washer abutting against a shoulder in the bore of the boss. The valve in the branch being then closed, the holder is detached and the end of the screw-plug and the hole in which it presents itself are burred over and sealed by brazing or soldering.

In order to provide for expansion of the liquid chlorine in the holder due to increase of temperature, I flatten the holder a little before it is charged at one place or at several places to allow for its bulging afterward when the liquid expands. When it is desired to use part of the chlorine contained in the holder, a branched tube similar to that employed for charging the holder may be connected to the boss, and the plug can be unscrewed.

Figure 2:
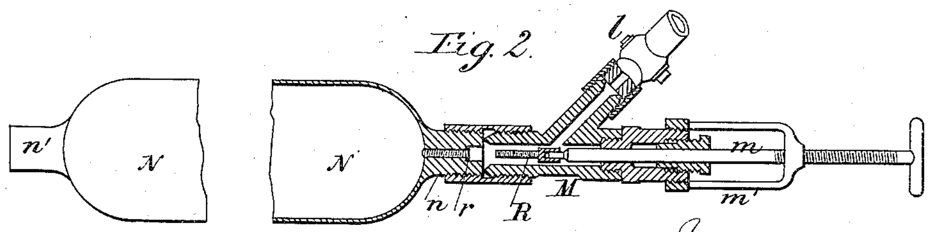
Figure 3:
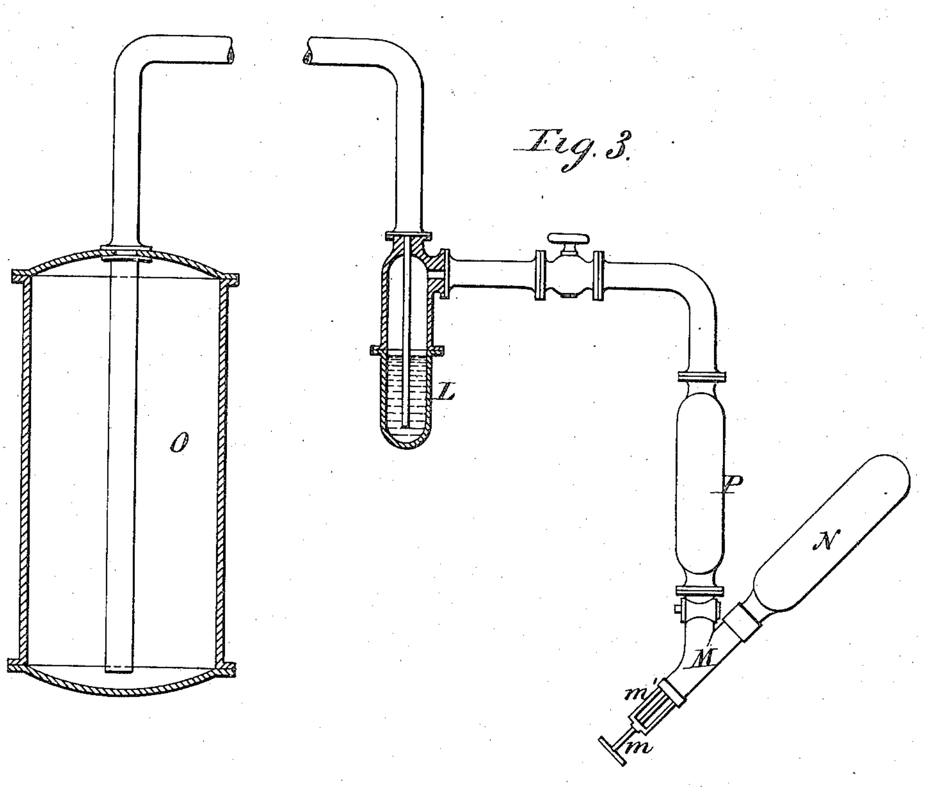

In the accompanying drawings, Figure 1 is a sectional view of an apparatus embodying my invention, the transporting vessel or holder being in elevation. Fig. 2 is a broken sectional elevation of the transporting vessel or holder on a larger scale, showing also the devices for connecting it with the vessels charged with liquefied chlorine and sulphuric acid; and Fig. 3 is a sectional elevation showing a modification.

Referring to Fig. 1, K is the funnel-shaped vessel which is charged with the crystalline compound or chlorine and water formed by blowing gaseous chlorine through water kept at a temperature about freezing-point. To the bottom of the vessel K, which has a small outlet, is attached a trap-vessel L, containing strong sulphuric acid, and to this is attached the branched pipe M (shown on an enlarged scale in Fig. 2) for charging one of the storing-vessels N. This vessel is a thin but strong steel tube closed at both ends, the one end having a projecting boss $n$ with a screwed hole and shoulder to receive a screwed plug R. It is preferred to make a boss $n'$ at the other end of the tube N for convenience of lifting. The branched pipe M is provided with a spindle $m$, which passes through a stuffing-box and is screwed through an external yoke $m'$, the thread being equal in pitch to that of the plug R, the head of which is made as a socket to receive the squared end of the spindle $m$. A packing-washer $r$ being placed in the hole of the boss $n$ and the plug R having been inserted within M and engaged on the end of the spindle $m$, the branched pipe M is connected, as shown, to the holder N and to the trap L, the jointings being tightened thoroughly against leakage. Moderate heat being now applied to the vessel K, the crystalline compound of chlorine and water becomes decomposed, producing considerable pressure, the liquid chlorine subsiding in the lower part of K and the water floating above it. The cocks $k$ and $l$ being now opened, the liquid chlorine passes first through the sulphuric acid in L, by which any water that may accompany it is absorbed, and the pure liquid chlorine then flows by the branch pipe M into the holder N. When this is thus charged, the cocks $k$ and $l$ are closed. The spindle $m$ is turned, screwing the plug R into the boss $n$, and when the plug is screwed home, so as to compress the washer $r$, the holder N can be detached. The head of the plug R or the metal of the boss surrounding it can be burred over, and the joint can be made good by soldering.

The vessel K should be of considerable strength to resist the internal pressure, and should be lined with lead which is not materially acted on by the chlorine.

The liquefied chlorine when freed from water, is what may be termed "chemically dry," and in this condition it does not attack iron or steel. Consequently the branched pipe M and the holders N can be made of these metals without requiring any protective lining.

I prefer to provide two tubes, the one $k'$ from the top and the other $k^2$ from the bottom of the vessel K, in order to run off the gas and the more or less chlorinated water for subsequent treatment after the liquid chlorine is mostly transferred to holders.

Although I have described the branched pipe M as being applied to the vessel K, it may obviously be connected to any other receptacle of chlorine liquefied by cold or pressure, or both. Thus, as shown in Fig. 3, chlorine liquefied by cold or pressure may be transferred from a vessel O in which it is generated or stored to the holders N, passing on its way through sulphuric acid in L.

A measuring-vessel P may be interposed to determine the charge of the holder N, so as to leave in each holder a little space for expansion of the liquid contents. The vessel P may be a strong glass tube graduated, so that the amount of charge may be visible.

What I claim is—

1. The combination of a transporting vessel or holder N, having at one end an externally-screw-threaded boss $n$, containing a threaded orifice to receive a screw-plug, with the closed vessel K, adapted to be charged with a crystalline combination of chlorine and water, a vessel L in communication with said closed chlorine-vessel and adapted to be charged with sulphuric acid for depriving the liquid chlorine of water, a charging branch M, for connecting the acid-vessel with the transporting vessel or holder, a screw-spindle $m$, extending into the charging branch, and a screw-plug R, detachably connected with the spindle and adapted to be screwed into the threaded orifice of the transporting vessel or holder, substantially as described.

2. The combination, with a closed chlorine-vessel, of a vessel L, for containing sulphuric acid to deprive the liquefied chlorine of water, a valved charging branch M, in communication with the acid-vessel and having a screw-thread for connecting it with a transporting vessel or holder N, a screw-threaded spindle $m$, extending into the charging branch, and a screw-plug R, detachably connected with the spindle within the charging branch and adapted to be screwed to the transporting vessel or holder, substantially as described.

In testimony whereof I have signed my name to this specification, in the presence of two subscribing witnesses, this 4th day of April, A. D. 1889.

J. B. HANNAY.

Witnesses:

OLIVER IMRAY,
*Patent Agent, 28 Southampton Buildings, London, W. C.*

JNO. P. M. MILLARD,
*Clerk to Messrs. Abel & Imray, Consulting Engineers and Patent Agents, 28 Southampton Buildings, London, W. C.*